United States Patent Office 3,532,592
Patented Oct. 6, 1970

3,532,592
BONDING MONOOLEFIN POLYMERS
TO RUBBERS
Gerard Kraus and Clifford W. Childers, Bartlesville, Okla., assignors to Phillips Petroleum Company, a corporation of Delaware
No Drawing. Original application Dec. 13, 1965, Ser. No. 513,605. Divided and this application May 22, 1968, Ser. No. 731,268
Int. Cl. C09j 3/12; B32b 25/16, 27/32
U.S. Cl. 161—243      10 Claims

ABSTRACT OF THE DISCLOSURE

Rubbery monoolefin polymers are bonded to sulfur vulcanizable rubbers by sandwiching a layer of a sulfur vulcanizable composition formed by reacting a halogenated monoolefin polymer with a lithium-terminated conjugated diene polymer between the two materials said vulcanizable compositions contain a vulcanization agent such as sulfur or a peroxide and heating the resulting laminate to covulcanize same.

---

This is a division of application Ser. No. 513,605, filed Dec. 13, 1965 now abandoned.

This invention relates to a process for making vulcanizable polymers of monoolefins. In another aspect, this invention relates to a vucanizable rubbery polymer of a monoolefin.

Many 1-monoolefins, such as ethylene and propylene, are inexpensive polymerizable monomers which are commercially available in great volumes. Such monomers can be polymerized to form polymers ranging from low molecular weight oils to high molecular weight solids. The curing or vulcanization of many of these polymers cannot be conveniently carried out in the conventional manner, for example, by vulcanization with sulfur as in the case of butadiene-type polymers. This difficulty in vulcanization of the polymers of 1-monoolefins is due to the lack of ethylenic unsaturation in the polymer. Vulcanization of these polymers requires the use of expensive high-energy radiation or organic peroxides. Such methods for vulcanization often have an adverse effect on the unique properties possessed by the polymers, especially ethylene/propylene copolymers which are high molecular weight rubber-like substances having a high degree of resistance to weathering, sunlight and ozone.

A number of processes have been proposed for chemically modifying the polymers of 1-monoolefins, particularly ethylene/propylene copolymers in order to impart some degree of unsaturation in the copolymer to make it possible to cure them with sulfur. Such modifications can be achieved by incorporating a different copolymerizable monomer, such as an open-chain nonconjugated diolefin, into the polymer chain. It is apparent that there is a need for improved processes for making vulcanizable polymers of monoolefins from more economically available materials.

Accordingly, it is an object of this invention to provide an improved process for producing vulcanizable polymers of monoolefins. Another object is to provide an improved process for modifying an ethylene/propylene copolymer so as to impart some degree of unsaturation thereto and make it readily vulcanizable with sulfur. Still another object is to provide vulcanizable polymers of monoolefins. Further objects, aspects and advantages of this invention will become apparent to those skilled in the art from the following description and accompanying claims.

We have discovered an improved process for making polymers of monoolefins vulcanizable by a series of steps wherein ethylenic unsaturation is introduced into the polymer. Briefly stated, we have discovered that by halogenating a polymer of a monoolefin with either chlorine or bromine and subsequently reacting the halogenated polymer with a lithium terminated polymer of a diolefin, we can produce vulcanizable polymers. This is an improvement over the prior art methods for making vulcanizable polymers of monoolefins. The invention is especially applicable to making vulcanizable rubbery polymers of monoolefins. The lithium terminated polymer that is reacted with the halogenated monoolefin polymer can be either liquid or rubbery. The resulting polymer product retains its rubbery properties and also retains a high degree of resistance to weathering, sunlight and ozone.

Our invention can be used to convert polymers of monoolefins into a final polymer product that can be easily vulcanized. Processes for making polymers of monoolefins are well known in the art and will not be discussed at length in this specification. Examples of polymers of monoolefins that can be employed include polyethylene, polypropylene, polybutene, and the like. Examples of rubbery polymers of monoolefins that can be employed include ethylene/propylene and ethylene/1-butene copolymers. We have also found that rubbery polymers of monoolefins known as "terpolymers", in which certain monomers have introduced unsaturation into the polymer chain, can also be utilized in the process of our invention. In such cases, the terpolymers are more easily vulcanized into products having improved properties. Examples of such terpolymers are copolymers of ethylene/propylene/dicyclopentadiene, ethylene/propylene/1,4-hexadiene, ethylene/propylene/vinylacetylene, ethylene/propylene/isopropenylacetylene, ethylene/propylene/fulvene, ethylene/1-butene/6,6-dimethylfulvene, and the like.

The polymers of monoolefins can be halogenated by any method known in the art. One method is to dissolve the polymer in a suitable solvent such as chloroform, methylene chloride, carbon tetrachloride, or tetrachloroethylene and contact it with the elemental halogen, which is either chlorine or bromine. Preferably, the polymer will be chlorinated. One convenient method for producing the chlorinated or brominated polymer of monoolefin is to carry out the polymerization process in a halogenated solvent using any known catalyst system. For example, carbon tetrachloride could be used as a polymerization solvent in an organometallic catalyst system. The polymerization of the monoolefin could be carried out in a polymerization zone and upon completion of the polymerization, the solution of the polymer could be withdrawn and passed to a halogenation zone. There, the polymer could be halogenated by passing either the elemental chlorine or elemental bromine through the polymer solution. The conditions for the halogenation step will of course depend upon the specific type of polymer being halogenated and the specific procedure being utilized. Generally, the temperature of the halogenation zone is maintained in the range of about 10–150° C. The pressure in the halogenation zone need only be sufficient to maintain the solvent substantially in the liquid phase. While this may be a preferred embodiment, any method known in the art for halogenating the polymer of a monoolefin can be used.

We have found it to be desirable to add sufficient bromine or chlorine to the polymer of a monoolefin so as to produce a halogenated polymer that contains from 1 to 15 weight percent of the chlorine or bromine. Using conventional halogenation methods, the halogen atoms will be distributed along the polymer chain and will provide reactive sites for the subsequent reaction with the lithium terminated polymer of the diolefin.

After the polymer of a monoolefin has been halogenated, it is then reacted with a lithium-terminated polymer of a diolefin. It is known in the art that polymers of a diolefin contain ethylenic unsaturation and are readily vulcanizable. The lithium-terminated polymer of the diolefin will generally be prepared by polymerizing a conjugated diene in the presence of an organolithium initiator in a solution polymerization system. Such types of conjugated diene polymerizations are well known in the art. We prefer to use lithium-terminated polymers of conjugated dienes that contain from 4 to 12 carbon atoms per molecule. The preferred conjugated dienes are butadiene, isoprene, piperylene, and the like. These conjugated dienes can be polymerized alone or in admixture. They can also be copolymerized with other polymerizable materials containing a

group such as styrene, alkyl-substituted styrenes, and 1- and 2-vinylnaphthalene.

The polymerization of diolefins or mixtures thereof with other comonomers, as hereinbefore specified, is conducted in the presence of an organolithium catalyst. Preferably, a monolithium catalyst will be used. Examples of suitable monolithium initiators are n-propyllithium, isopropyllithium, n-butyllithium, sec-butyllithium, tert-butyllithium, n - pentyllithium, tert-hexyllithium, and the like. It is also within the scope of our invention to utilize dilithium initiators that are adducts of lithium with compounds such as 1,2-diphenylethylene, naphthalene, methylnaphthalene, etc. In some cases, it may be desirable to utilize organolithium compounds that contain up to 4 lithium atoms per molecule to produce the lithium terminated polymers.

The lithium-terminated polymer is conveniently utilized in the form in which it comes from the polymerization reactor. In such cases, the lithium-terminated polymer is usually dissolved in a polymerization diluent. The dissolved lithium-terminated polymer is combined with a suitable solution of the halogenated monoolefin polymer and the reaction between the two different polymers is allowed to proceed. It is necessary that the two different polymers be intimately contacted with each other. The intimate contact between the polymers is most easily achieved by carrying out the reaction in a solution wherein both polymers are dissolved. The temperature for the reaction step can vary over a broad range. Generally, the temperature will be in the range of from about $-75$ to $150°$ C. However, temperatures outside this range can be used in some instances. The preferred temperature range is from 0 to $75°$ C. The time for the reaction will depend upon the temperature and will generally be in the range of from about 30 minutes to 100 hours or more.

The vulcanizable polymer products of this invention can have widely varying properties. The halogenation of the polymer of this monoolefin can be controlled to control the number of halogen atoms attached to the polymer molecule. The number of halogen atoms attached to the polymer molecule will have a direct effect upon the amount of unsaturation that is introduced into the final product upon the reaction with the lithium-terminated polymer of the diolefin. When there is relatively little unsaturation introduced into the final polymer product, the product will not produce a "tight cure" upon vulcanization. Conversely, there will be a "tight cure" upon vulcanization of a polymer product having a large number of double bonds.

The molecular weight of the lithium-terminated conjugated diene polymer can vary over a wide range. We have found that it is desirable to use lithium-terminated polymer diolefins that have a molecular weight of from about 500 to about 50,000. The molecular weight of the polymer of the diolefin is very easily regulated in the polymerization system by controlling the amount of the organolithium catalyst.

The amount of the lithium-terminated polymer of the diolefin that is reacted with the halogenated polymer of the monoolefin is usually in the range of from 1 to 60 parts by weight of the lithium-terminated diolefin polymer per 100 parts by weight of the total polymer composition.

The vulcanization or curing of the novel polymers of this invention can be carried out by using conventional sulfur vulcanization procedures. Generally, the vulcanization temperature will be in the range of from about 250 to about $400°$ F. for a period of from about 5 to 120 minutes. The amount of sulfur employed will generally be in the range of from about 0.1 to 5 parts per 100 parts of the polymer and usually from about 0.5 to 3 parts per 100 parts of polymer. The polymers can also be cured with compounds which can decompose to form free radicals such as peroxides. Examples of such peroxides are diisopropyl peroxide, di-tert-butyl peroxide, dibenzoyl peroxide, tert-butyl perbenzoate, and the like. When the peroxides are used, they will normally be used in the range of from about 0.1 to 10 parts per 100 parts of polymer. The polymers can also be cured with combinations of peroxides and sulfur. In such cases, the ratio of peroxide to sulfur by weight will generally be in the range of from about 0.1 to 1 or 4 to 1.

Various vulcanizing agents, vulcanization accelerators, accelerator activators, reinforcing agents, extenders, plasticizers, antioxidants, and fillers can be utilized in the compounding and vulcanization of the polymers of this invention. Examples of such fillers and reinforcing agents are carbon black, clay, calcium silicate, talc, silica, whiting and titanium dioxide. Generally, the polymer products of our invention will have molecular weights in the range of about 5,000 to one million and can be used in fabricating such rubber goods as coatings for electrical cables, window seals, garden hose, soles and heels for shoes, belts, coated fabrics, tires, films, and the like.

We have found that the polymer products of our invention are especially useful in applications wherein conventional polymers of monoolefins are bonded to conventional sulfur vulcanizable polymers. For example, rubbery polymer products of this invention can be used as "tie gums" between ethylene/propylene rubber and sulfur vulcanizable natural rubber or synthetic rubbers. By merely placing a layer of our novel polymer between the conventional ethylene/propylene rubber and a conventional sulfur vulcanizable rubber and subsequently subjecting the three layers to vulcanization temperatures, the three layers can be bound together to form a tight strong bond. It will be easily recognized that it will now be possible to use the polymers of our invention as tie gums in the construction of ethylene/propylene tires wherein the ethylene/propylene tread is bound to a natural rubber carcass. By using the polymers of our invention, it is now possible to bond previously incompatible rubbers together, such as ethylene/propylene rubber and natural rubber, by placing a layer of our novel polymer between the ethylene/propylene rubber layer and the natural rubber layer and subjecting the three layers to vulcanization conditions.

Some of the objects and advantages of our invention are illustrated in the following examples. It should be understood that the various materials used in these examples, the conditions of operation, and other details, should not be construed to unduly limit this invention.

EXAMPLE I

A sulfur-curable ethylene/propylene/diene rubber (Nordel 1040) was chlorinated at room temperature (about 75° F.) in tetrachloroethylene solution in the presence of light from a fluorescent lamp. The mixture was agitated during the introduction of chlorine. Evolution of hydrogen chloride was noted after 20 minutes. Addition of chlorine was continued for two hours. The product was coagulated in isopropyl alcohol, shredded and soaked overnight in isopropyl alcohol, separated, and dried in a vacuum oven at 60° C. Properties of the original and chlorinated polymer were as follows:

|  | Original | Chlorinated |
|---|---|---|
| Propylene, wt. percent | 52 |  |
| Inherent viscosity [1] | 1.82 | 1.83 |
| Mooney viscosity (ML-4 at 212° F., ASTM D-1646-63) | 62 |  |
| Toluene insolubles, wt. percent | 0 | 0 |
| Unsaturation [2], wt. percent | 1.29 |  |
| Chlorine, wt. percent |  | 11.9 |

[1] Determined by procedure shown in U.S. 3,078,254, column 10, lines 13–22.

[2] Determined by the following procedure:
ICl titration: A 0.5-gram sample of polymer was dissolved in a 75/25 volume mixture of carbon disulfide and chloroform, a chloroform solution of iodine chloride of known concentration (approximately 0.09–0.10) molar was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

Two runs were made for the preparation of polybutadienyllithium of different molecular weights. The following recipes and conditions were used.

|  | A | B |
|---|---|---|
| 1,3-butadiene, grams | 50 | 50 |
| Cyclohexane, ml | 510 | 510 |
| sec-Butyllithium, mmoles | 50 | 5 |
| Temperature, ° F | 86 | 122 |
| Time, hours | 16 | 6 |
| Molecular weight, calculated (number avg.) | 1,000 | 10,000 |

Two 10-gram samples of the chlorinated ethylene/propylene/diene rubber described above were dissolved in 300 milliliters of cyclohexane. Polybutadienyl-lithium solution from run A was added to one portion (hereinafter designated as run 1) and that from run B to the other portion (hereinafter designated as run 2), the amount of solution in each case being sufficient to provide 10 grams of polymer. These mixtures were agitated 16 hours at 50° C. The solutions were then extracted with distilled water to remove lithium chloride and the polymers coagulated in isopropyl alcohol containing 2,2'-methylene-bis(4 - methyl-6-tert-butylphenol) antioxidant. The amount of antioxidant used was approximately one part by weight per 100 weight parts of polymer. Results were as follows:

|  | Total weight of product, g. | PBd used, mol. wt. | PBd in product, g. |
|---|---|---|---|
| Run: |  |  |  |
| 1 | 11.40 | 1,000 | 1.40 |
| 2 | 14.85 | 10,000 | 4.85 |

Note.—PBd=polybutadiene.

In order to determine whether lithium terminated polybutadiene reacted with the chlorinated ethylene/propylene/diene rubber, samples of polybutadiene from runs A and B were recovered after inactivation of the catalyst with isopropyl alcohol. Blends of the polybutadiene with the chlorinated ethylene/propylene/diene rubber were prepared on a roll mill. Ten grams of the chlorinated ethylene/propylene/diene rubber was used in each blend. Run 3 contained 1.40 grams of the polybutadiene of 1000 molecular weight and served as a control for run 1. Run 4 contained 4.85 grams of the polybutadiene of 10,000 molecular weight and served as a control for run 2.

Products from the four runs were compounded in accordance with the following recipe:

|  | Parts by weight |
|---|---|
| Polymer | 100 |
| High abrasion furnace black | 50 |
| Zinc oxide | 3 |
| Stearic acid | 2 |
| Sulfur | 2 |
| N-cyclohexyl-2-benzothiazolesulfenamide | 1.5 |
| Diphenylguanidine | 0.5 |

The stocks were cured 30 minutes at 307° F. after which tensile strength and elongation were determined. Results were as follows:

| Run | Tensile, p.s.i.[1] | Elongation, percent[1] |
|---|---|---|
| 1 (Polymer reaction product) | 2,480 | 545 |
| 2 (Polymer reaction product) | 440 | 130 |
| 3 (Blend) | 176 | 190 |
| 4 (Blend) | 390 | 225 |

[1] Determined by procedure of ASTM D-412-62T.

The pronounced difference in properties between the product from run 1 and the physical blend from run 3 indicates that a reaction did take place between the chlorinated polymer of a monoolefin and the lithium terminated polybutadiene. The polybutadiene chains attached to the chlorinated backbone polymer gave a good vulcanizate whereas the blend in run 3 appears to be grossly undercured. The polymer product in run 2 had a higher tensile strength and lower elongation than the physical blend in run 4. When both properties are considered, it can be seen that the product from run 2 is not merely a physical blend.

EXAMPLE II

A rubbery ethylene/propylene copolymer was chlorinated as in Example I to give a product that had a chlorine content of 12.3 weight percent. The original sample had a Mooney value (ML-4 at 212° F.) of 42, an inherent viscosity of 1.91, and a propylene content of 64 weight percent. Solutions of two 20-gram samples of the chlorinated polymer in 300 milliliters of cyclohexane were prepared. A polybutadienyllithium solution prepared as in run A, Example I, sufficient to provide 20 grams of polymer, was added to one of the chlorinated polymer solutions. A similar mixture was prepared using polybutadienyllithium prepared as in run B, Example I. The mixtures were agitated 20 hours at 50° C. and products recovered by coagulation in isopropyl alcohol containing 2,2' - methylene-bis(4-methyl-6-tert-butylphenol. Results were as follows:

|  | Total weight of product, g. | PBd used, mol. wt. | PBd in product, wt. percent |
|---|---|---|---|
| Run: |  |  |  |
| 1 | 31.5 | 1,000 | 36.5 |
| 2 | 37.2 | 10,000 | 46.2 |

The two products were compounded and cured as in Example I. Results were as follows:

|  | Run 1 | Run 2 |
|---|---|---|
| Tensile, p.s.i.[1] | 1,810 | 1,630 |
| Elongation, percent | 600 | 420 |

[1] Determined by procedure of ASTM D-412-62T.

In each case the entire sample cured to give a good vulcanizate, thus indicating that a reaction took place between the chlorinated ethylene/propylene copolymer and the polybutadienyllithium. If the polybutadiene had been present as a physical blend with the chlorinated polymer, the entire composition would not have cured.

EXAMPLE III

A series of runs was made to evaluate the effectiveness of the polymers of this invention as "tie gums." Two runs were made in which a thin sheet of high cis-polybutadiene and a thin sheet of a terpolymer of ethylene/propylene/diene were bonded together and vulcanized. In one run the cis-polybutadiene and the ethylene/propylene/diene terpolymer were placed in contact with each other and vulcanized. In the other run, a layer of the rubbery polymer produced in Example II, run 1, was "sandwiched" between the cis-polybutadiene and the terpolymer. The cis-polybutadiene and the terpolymer sheets were arranged so as to form a lap joint. The strips were placed in a mold comprising two metal plates, pressure was applied to the joint, and the strips were subjected to 307° F. for 30 minutes. At the end of the cure time, the vulcanized sheets were removed from the mold, and one-inch wide specimens were cut from the bonded sheets. The specimens were then placed in an Instron machine and tension was applied to determine the strength of the bond between the materials. The cis-polybutadiene flap was clamped in one clamp on the Instron and the terpolymer flap was clamped on the other clamp on the Instron machine. Observations were made as to where the lap joint failed and to how much load was applied at the time of the failure.

The tie gum layer was compounded according to the recipe of Example I.

The cis-polybutadiene and the terpolymer layers were compounded as follows:

|  | Cis-polybutadiene layer | Terpolymer layer |
| --- | --- | --- |
| Cis-polybutadiene [1] | 100 |  |
| Terpolymer [2] |  | 100 |
| High abrasion furnace carbon black | 50 | 50 |
| Aromatic extender oil | 5 | 20 |
| Zinc oxide | 3 | 5 |
| Stearic acid | 2 | 1 |
| Flexamine [3] | 1 | 1 |
| Sulfur | 1.75 | 1.5 |
| NOBS Special [4] | 0.9 |  |
| Monex [5] |  | 1.5 |
| Captax [6] |  | 0.5 |

[1] ML-4 at 212° F., 46; Inherent viscosity, 2.54; Microstructure, percent: cis, 94.9; trans, 2.0; vinyl, 3.1.
[2] A rubbery ethylene-propylene-diene terpolymer (Nordel 1070) having: 48% (weight) propylene; 1.2% (weight) unsaturation; inherent viscosity of 2.28 (determined in toluene, 0.1% solution, at 25° C.); 5% (weight) toluene insolubles at 25° C.; and Mooney viscosity of 85 (ML-4 at 212° F.).
[3] A physical mixture containing 65% of a complex diarylamineketone reaction product and 35% of a N,N'-diphenyl-p-phenylene-diamine.
[4] N-oxydiethylene-2-benzothiazolesulfenamide.
[5] Tetramethylthiuram monosulfide.
[6] 2-mercaptobenzothiazole.

The following observations were made on the specimens:

|  | Tension at failure, lb. | Area of bond, in.[2] | Failure |
| --- | --- | --- | --- |
| Run 1 (cis-polybutadiene bonded directly to terpolymer) | 14.1 | 1.5 | Bond pulled apart at interface of the cis-polybutadiene and terpolymer. |
| Run 2 (cis-polybutadiene and terpolymer layers with tie gum between) | 18.6 | 1.5 | Terpolymer flap tore. Bond between the three layers remained intact. |

The foregoing results show that a superior bond was formed between the cis-polybutadiene and the ethylene/propylene terpolymer when the polymer products of this invention were used as tie gums. These data show that the polymer products of this invention can be used effectively to bond rubbery monoolefin polymers to sulfur vulcanizable rubbers. It should be noted that the ethylene/propylene/terpolymer is of the type that is commercially available and is itself sulfur vulcanizable. These data show the improved bonding properties that can be obtained by using the polymers of our invention as "tie gums" for bonding monoolefin polymers to sulfur vulcanizable rubber polymers.

We claim:
1. A method for bonding ethylene/propylene copolymer or ethylene/propylene terpolymer to sulfur vulcanizable natural or synthetic rubber comprising placing between the two materials to be bonded a layer of a vulcanizable composition comprising sulfur or peroxide vulcanizing agent and polymeric material formed by reacting an ethylene/propylene copolymer or ethylene/propylene terpolymer, which has been halogenated with bromine or chlorine and contains 1 to 15 parts by weight of the halogen per 100 parts by weight of the halogenated polymer with a lithium-terminated polymer of a conjugated diene wherein said lithium-terminated polymer of conjugated diene has a molecular weight of from about 500 to about 50,000 and is present in an amount of from about 1 to about 60 parts by weight per 100 parts by weight of said polymeric material and heating the resulting laminate sufficiently to vulcanize said laminate.

2. A vulcanized laminate comprising (A) a first layer formed from sulfur vulcanizable natural or synthetic rubber; (B) a second layer formed from sulfur vulcanizable composition comprising sulfur or peroxide vulcanizing agent and polymeric material formed by reacting an ethylene/propylene copolymer or ethylene/propylene terpolymer, which has been halogenated with bromine or chlorine and contains 1 to 15 parts by weight of the halogen per 100 parts by weight of the halogenated polymer, with the lithium-terminated polymer of a conjugated diene wherein said lithium-terminated polymer of conjugated diene has a molecular weight of from about 500 to 50,000 and is present in an amount of from about 1 to 60 parts by weight per 100 parts by weight of said polymeric material, and (C) a third layer of a rubbery ethylene/propylene copolymer or ethylene/propylene terpolymer, with (B) being disposed between (A) and (C).

3. The method according to claim 1 wherein said conjugated diene is butadiene.

4. The method according to claim 3 wherein said halogenated polymer is a copolymer of ethylene and propylene.

5. The method according to claim 4 wherein said rubbery polymer of monoolefin to be bonded is a terpolymer of ethylene, propylene and a nonconjugated diene.

6. The method according to claim 5 wherein said sulfur vulcanizable rubber to be bonded is polybutadiene.

7. The laminate according to claim 2 wherein said lithium-terminated polymer of (B) is polybutadiene.

8. The laminate according to claim 7 wherein said halogenated polymer of (B) is copolymer of ethylene and propylene.

9. The laminate according to claim 8 wherein said rubbery monoolefin polymer of (C) is a terpolymer of ethylene, propylene and a nonconjugated diene.

10. The laminate according to claim 9 wherein said sulfur vulcanizable rubber of (A) is polybutadiene.

References Cited

UNITED STATES PATENTS

| 2,809,372 | 10/1957 | Frederick | 260—5 |
| 2,933,480 | 4/1960 | Gresham et al. | 260—80.5 |
| 3,135,717 | 6/1964 | Gregorian et al. | 260—45.5 |

OTHER REFERENCES

Industrial & Engineering Chemistry, vol. 56, No. 2, February 1964, pp. 9–10.

JOHN T. GOOLKASIAN, Primary Examiner

C. B. COSBY, Assistant Examiner

U.S. Cl. X.R.

156—333, 334; 161—253, 254, 255, 256; 260—5, 80.78, 878